Figure 1:
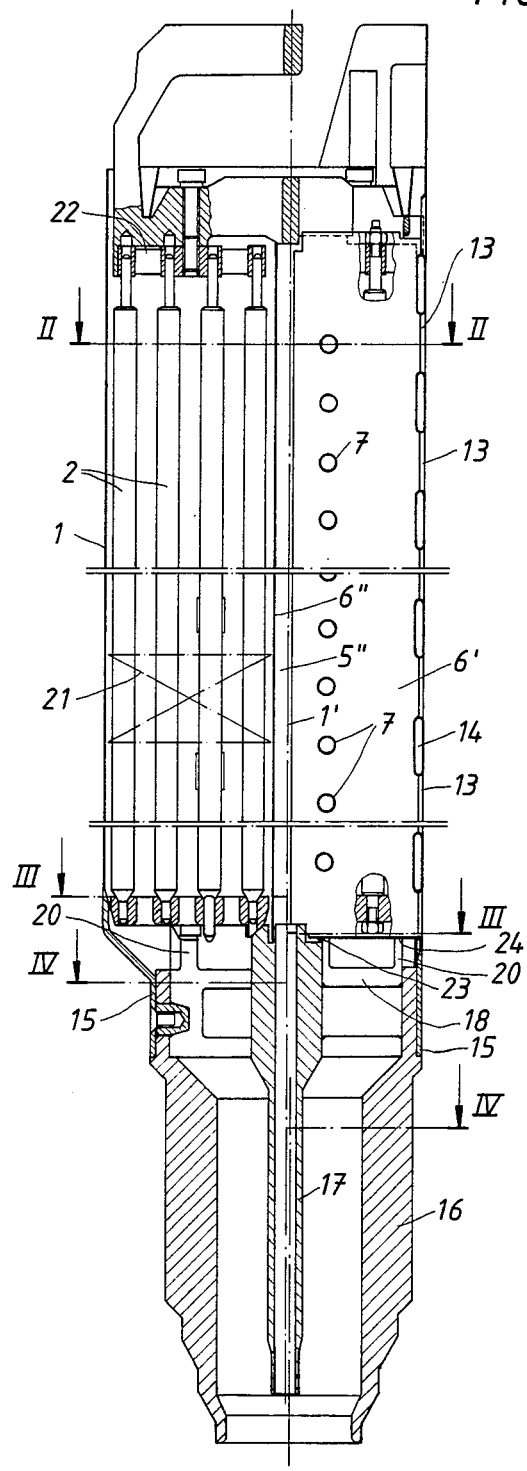

United States Patent [19]

Borrman et al.

[11] Patent Number: 4,514,358
[45] Date of Patent: Apr. 30, 1985

[54] FUEL ASSEMBLY

[75] Inventors: Bo Borrman; Erik Hellman; Bengt Ode; Aart van Santen, all of Västerås, Sweden

[73] Assignee: AB ASEA-ATOM, Västerås, Sweden

[21] Appl. No.: 592,741

[22] Filed: Mar. 23, 1984

Related U.S. Application Data

[63] Continuation of Ser. No. 249,561, Mar. 31, 1981, abandoned.

[51] Int. Cl.³ .............................................. G21C 15/00
[52] U.S. Cl. .................................... 376/362; 376/438; 376/448
[58] Field of Search ............... 376/362, 364, 438, 443, 376/444, 448

[56] References Cited

U.S. PATENT DOCUMENTS

| | | |
|---|---|---|
| 3,036,964 | 5/1962 | Horning . |
| 3,122,484 | 2/1964 | Iskenderian ......................... 376/448 |
| 3,158,543 | 11/1964 | Sherman et al. . |
| 3,164,530 | 1/1965 | Banks . |
| 3,183,164 | 5/1965 | Guild et al. . |
| 3,205,144 | 9/1965 | Jabsen ................................. 376/438 |
| 3,212,984 | 10/1965 | Tollet et al. . |
| 3,338,791 | 8/1967 | Lass et al. . |
| 3,389,056 | 6/1968 | Frisch . |
| 3,567,582 | 3/1971 | Dievoet ............................... 376/438 |
| 3,607,639 | 9/1971 | Santen et al. . |
| 3,697,375 | 10/1972 | Suvanto et al. . |
| 3,808,098 | 4/1974 | Fredin . |
| 3,861,999 | 1/1975 | Zmola et al. . |
| 3,879,259 | 4/1975 | Persson ............................... 376/362 |
| 3,915,793 | 10/1975 | Andersson et al. . |
| 4,056,441 | 11/1977 | Marmonier et al. . |
| 4,088,534 | 5/1978 | Andrieu ............................. 376/438 |
| 4,325,786 | 4/1982 | Wohlsen . |
| 4,348,355 | 9/1982 | Nylund .............................. 376/448 |

FOREIGN PATENT DOCUMENTS

| | | |
|---|---|---|
| 621561 | 12/1962 | Belgium . |
| 648637 | 9/1964 | Belgium . |
| 1816561 | 8/1969 | Fed. Rep. of Germany . |
| 2623430 | 12/1976 | Fed. Rep. of Germany . |
| 1228851 | 3/1960 | France . |
| 1246458 | 10/1960 | France . |
| 2111642 | 6/1972 | France . |
| 334955 | 8/1971 | Sweden . |
| 1018481 | 1/1966 | United Kingdom . |
| 1341270 | 12/1973 | United Kingdom . |
| 1411116 | 10/1975 | United Kingdom . |
| 2054247A | 2/1979 | United Kingdom . |

*Primary Examiner*—Donald P. Walsh
*Attorney, Agent, or Firm*—Pollock, Vande Sande & Priddy

[57] ABSTRACT

A boiling water reactor fuel assembly is provided with an elongated, vertical stiffening device having four stiffening wings (4) which are each attached to a wall of the fuel box. Each stiffening wing has at least one vertically directed passageway for water. The stiffening device has a cruciform cross-section and is composed of four elongated members (6, 6', 6", 6''') of L-shaped cross-sections.

6 Claims, 11 Drawing Figures

FUEL ASSEMBLY

This application is a continuation of application Ser. No. 249,561 filed Mar. 31, 1981, now abandoned.

The present invention relates to a boiling water reactor fuel assembly comprising a plurality of vertical fuel rods surrounded by a fuel channel made with substantially square cross-section and positioned in the fuel channel with the aid of a plurality of spacers, the lower end of the fuel channel being hydraulically and mechanically connected to a nozzle which is provided with an inlet opening for water. The lower ends of the fuel rods rest on a grid device, which is supported by the nozzle.

A fuel assembly of the above kind is disclosed in U.S. Pat. No. 3,697,375. In this and other known fuel assemblies there is a tendency to creep deformations of the walls of the fuel channel. This phenomenon is caused, among other things, by the fuel channel being subjected to fast neutrons in combination with an internal overpressure, resulting in the walls being pressed outwards and acquiring a convex outer side. Creep deformations may thus result in a reduced gap width at some place in the control rod gaps, which may jeopardize the operability of the control rods.

It is possible to counteract, at least to a certain extent, the abovementioned pressing out of the walls of the fuel channel by providing the fuel channel with a centrally arranged stiffening device, which has a substantially cruciform cross-section along a predominant part of the vertical length of the fuel rods and is constructed in such a way that the fuel channel is divided into four vertical partial channels, each partial channel surrounding one partial bundle which comprises one-fourth of the total number of fuel rods in the fuel assemblies. Such a division into four is described in U.S. Pat. No. 3,164,530, where the stiffening device consists of four perforated dividing plates. Despite the perforation, it cannot be avoided that these dividing plates involve a considerable neutron absorption, which results in a reduced fuel economy.

With a fuel assembly according to the invention, the task is to stiffen the walls of the fuel channel by means of a stiffening device which has the mechanical advantages of the known stiffening device and which, in addition, has such a favourable effect on the neutron flow that the fuel economy is considerably better than with a corresponding fuel assembly without a stiffening device. This is achieved by using the stiffening device as a means for achieving in the reactor core a relatively evenly distributed moderator effect in horizontal direction, and thus a more even distribution of the neutron density.

The moderator effect of the stiffening device is achieved by providing said device with at least one through-going, vertical water passageway, running along a predominant portion of the length of the fuel rods and communicating at its lower end with at least one inlet opening for water. Since the water flowing through the vertical passageways of the stiffening device is subcooled and prevented from getting into touch with the fuel rods, its void content will be extremely small and its moderator effect the maximum one.

The stiffening device has a cruciform cross-section and is composed of four elongated bodies of L-shaped cross-section.

What characterises the invention will become clear from the appended claims.

Figure 2:
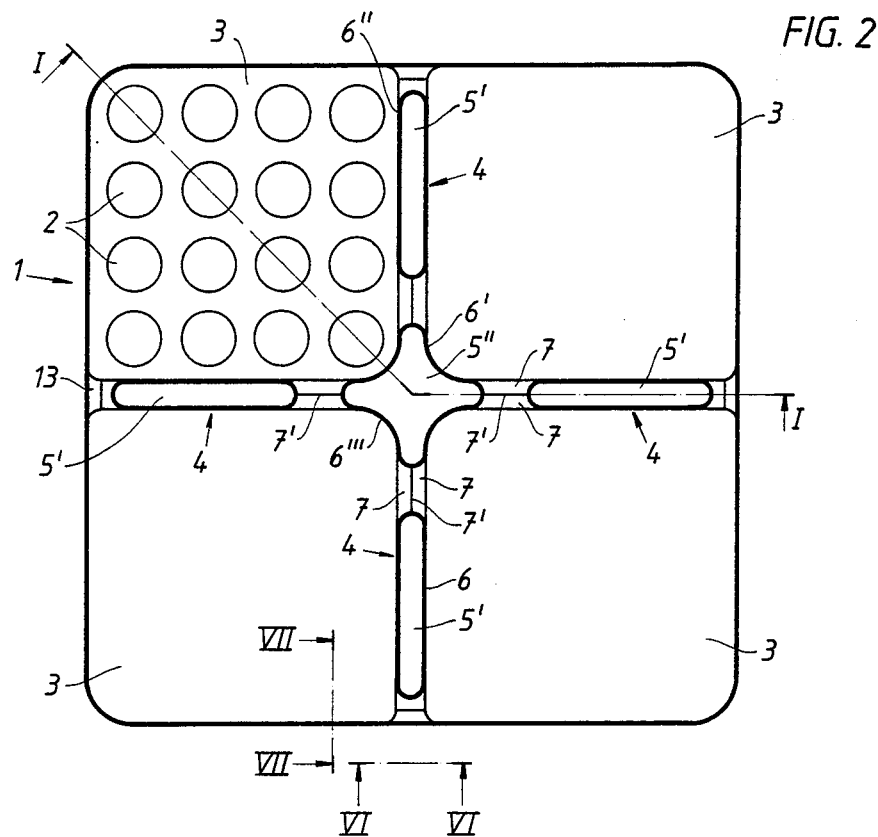
Figure 3:
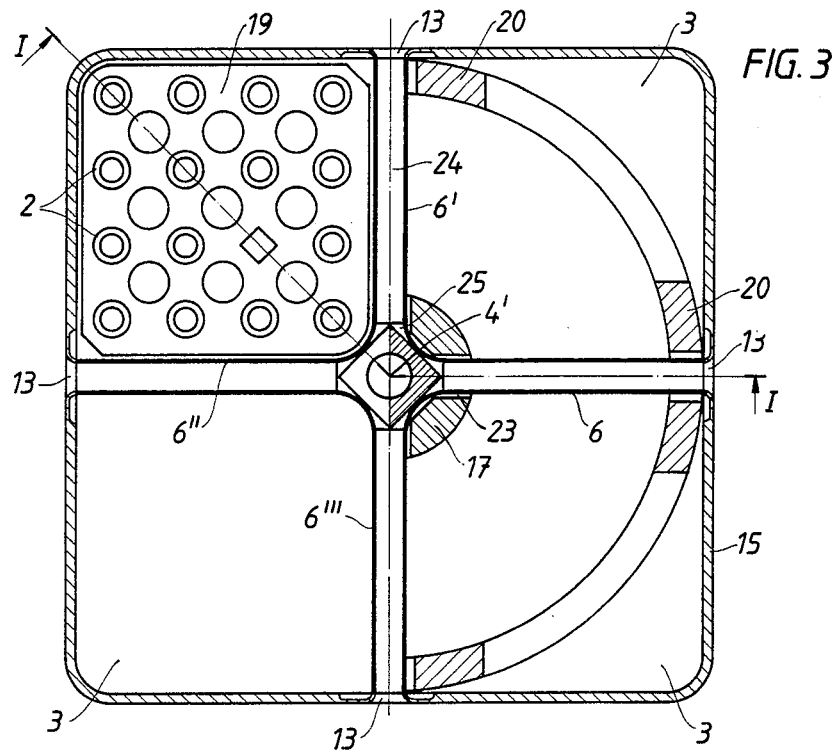
Figure 4:
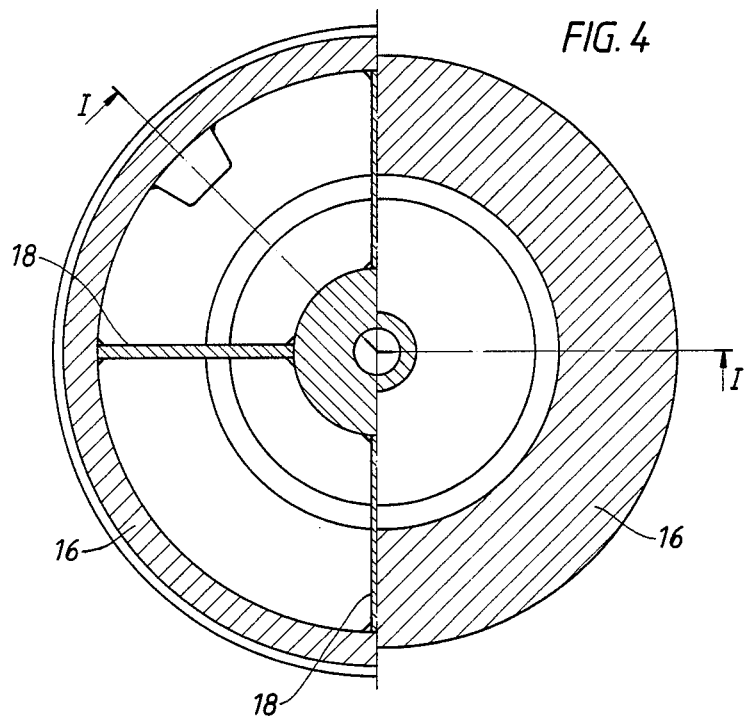

In the following, a fuel assembly according to the invention will be described with reference to the accompanying schematic drawings in which FIG. 1 shows a fuel assembly according to the invention in vertical section along I—I FIGS. 2, 3 and 4 show horizontal sections through the assembly along II—II, III—III, and IV—IV, respectively.

Figure 5A:
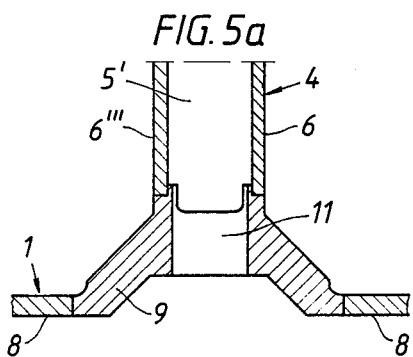
Figure 5B:
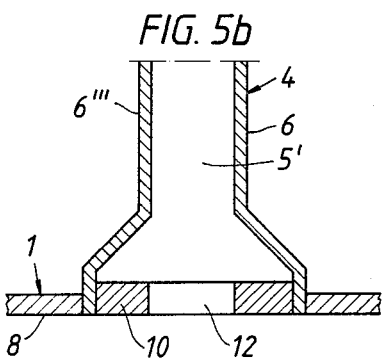
Figure 5C:
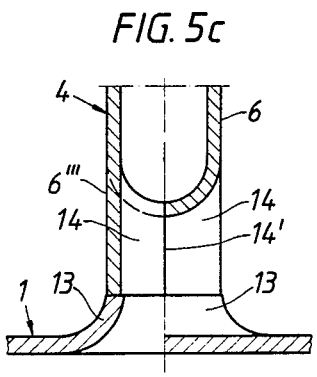

FIGS. 5a, 5b and 5c show three alternatives of a detail belonging to FIG. 2.

Figures 6A, 6B:
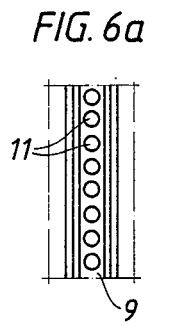
Figure 6C:
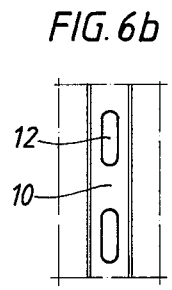

FIGS. 6a, 6b and 6c provide further information concerning the alternatives shown in FIGS. 5a, 5b and 5c, respectively, by showing them in a horizontal view as suggested by the arrows along VI—VI of FIG. 2.

Figure 7:
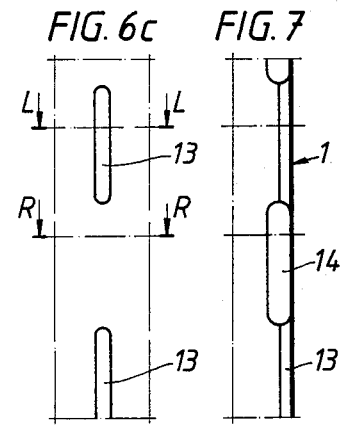

FIG. 7 shows the same alternative as in FIG. 6c, but in section along VII—VII of FIG. 2.

The left half of FIG. 5c shows a horizontal section along L—L of FIG. 6c, whereas the right half shows a horizontal section along the line R—R of the same figure.

The alternative embodiment disclosed in FIGS. 6c and 7 is also disclosed in FIGS. 1, 2 and 3.

In the drawings, 1 designates a fuel channel having a substantially square cross-section and a vertical center line 1'. The fuel channel 1 surrounds four groups of fuel rods 2 and is divided into four partial channels 3 with the aid of a hollow stiffening device of cruciform cross-section. The stiffening device has a vertical center line 4' and four stiffening wings 4, the vertical extension of which corresponds to the length of the fuel rods 2. Each wing 4 comprises a vertical water passageway 5', defined between mutually parallel sheet portions and running along the entire length of the wings. The cross-section areas of the passageways 5', together with the cross-section area of an adjacent central vertical passageway 5", constitute the total channel cross-section of the stiffening device. The stiffening device is composed of four elongated, vertical sheet-metal bodies 6, 6', 6", 6''' of L-shaped cross-section. Each stiffening wing 4 comprises two parallel, mutually spaced-apart sheet-metal portions, belonging to two of the L-shaped sheet-metal bodies. In each stiffening wing, each of the two confronting sheet-metal portions is provided with a plurality of inwardly-facing nozzles 7, each nozzle 7 of one sheet-metal portion being directed towards and welded to a corresponding nozzle 7 of the other sheet-metal portion by means of an annular welding seam 7'. Thus, in each wing 4, pairs of united nozzles 7 constitute a plurality of hydraulic connections between two partial fuel channels 3, which are located on different sides of the wing.

Each of the wings 4 is connected to a corresponding wall of the fuel channel 1 according to any of the constructional alternatives shown in partial, enlarged horizontal sections in FIG. 5a, 5b or 5c. In the alternatives shown in FIGS. 5a and 5b, the fuel channel 1 is substantially defined by four equal sheet-metal bodies 8, each of which having an L-shaped cross-section and including one of the four corner portions of the fuel channel 1. In the mid-portion of each channel wall, two sheet-metal bodies 8 are connected to each other by means of a vertical bar 9, or a sheet strip 10, welded between said bodies 8, said bar or sheet strip being provided with a plurality of openings 11 or 12, respectively, evenly distributed along the entire fuel channel, through which openings the vertical passageway, defined by the sheet-metal bodies 6, 6', 6", 6''' of the stiffening device, communicates horizontally with the water gaps located outside the fuel channel. The sheet-metal bodies 6, 6', 6", 6''' are welded to the bars 9, or alternatively to sheet strips 10 and sheet-metal bodies 8.

In the alternative shown in FIG. 5c, the fuel channel is made without separate, welded mid-portions inserted in the walls. Each of the four walls is provided with a corresponding vertical row of inwardly-directed nozzles 13 in the middle of the wall. Adjacent to each of the four walls of the fuel channel 1 there is a vertical row of hydraulic connections 14, arranged to connect two partial channels disposed at different sides of an intermediate stiffening wing. The connections 14 are formed in a similar manner as the above-described connections formed by nozzles 7, corbelled-out sheet-metal portions then being welded together by a welding seam 14'. Between the connections 14 the nozzles 13 are hydraulically connected to and welded to a stiffening wing 4.

The fuel channel 1 is made of Zircaloy ® and its lower end is welded to a Zircaloy ® sleeve 15 of substantially greater wall thickness. The sleeve 15 is fastened to an inlet nozzle 16. A water tube 17 is supported in coaxial relation to the inlet nozzle 16 by means of a plurality of radially directed arms 18 which are welded to the inlet nozzle 16 and to the water tube 17. Each partial fuel channel 3 contains a bundle of sixteen fuel rods 2 which are supported by a corresponding bottom tie plate 19. The four bottom tie plates are resting on the upper end of the water tube 17 and on a plurality of axial projections 20 formed at the upper end of the inlet nozzle 16. Each fuel bundle is furnished with a plurality of spacers 21 and a top tie plate 22. The lower ends of the elongated, L-shaped sheet metal bodies 6, 6', 6", 6''' are inserted in slots 23 formed at the upper end of the water tube 17 in such a manner that the interior of the cruciform stiffening device is hydraulically connected to the water tube 17. As each of the stiffening wings 4 is provided with a tight bottom 24, partly defining a central inlet opening 25 with their radial inner edges, the only water flux that can be supplied to the water passageways 5' and 5" through the nozzle 16 is that which is supplied by the water tube 17 and the inlet opening 25.

Alternatively, each of the bottoms 24 is perforated or no bottoms are provided, and alternatively the thinner part of the water tube 17 is omitted. However, the embodiment disclosed in the drawings is the preferable one.

We claim:

1. A fuel assembly for a boiling water reactor, said fuel assembly including a plurality of vertical fuel rods enclosed within a fuel channel separate from said fuel rods, said fuel channel being of substantially rectangular cross-section, wherein said fuel rods are positioned with the aid of top grid means, bottom grid means and a plurality of spacer devices, said fuel channel surrounding an elongated stiffening device for said fuel channel, said stiffening device being separate from said fuel rods and extending along a predominant portion of the length of said fuel rods, the vertical center line of said stiffening device lying in the vicinity of the vertical center line of said fuel channel, said stiffening device having four stiffening wings arranged in vertical planes and having angular distances of about 90° between themselves, said stiffening wings below said top grid means and above said bottom grid means being mechanically and fixedly connected to each other in the vicinity of the vertical center line of said fuel channel and welded to corresponding walls of said fuel channel to prevent said fuel channel from deforming outwardly during reactor operation, said wings constituting partitions between four bundles of fuel rods and each of said wings comprising at least one vertical internal water passageway extending along a predominant portion of the length of said fuel rods, whereby water flowing upward through said internal water passageway is prevented from contacting said fuel rods thus minimizing the void content of the water in said internal water passageway while maximizing its moderator effect, and said stiffening device comprising for elongated vertical sheet-metal bodies of substantially L-shaped cross-section arranged in spaced relationship to each other to define said water passageways, the corners of said sheet-metal bodies being disposed in the vicinity of said vertical center line of said fuel channel.

2. Fuel assembly according to claim 1, wherein each of said internal water passageways communicates with at least one inlet opening for water provided at the lower end of said stiffening device, and each of said stiffening wings comprises a pair of parallel sheet-metal portions, which belong to different said L-shaped sheet-metal bodies and are mechanically connected to each other in the vicinity of the vertical center line of the fuel channel by means of a plurality of connecting points distributed along said stiffening wing.

3. Fuel assembly according to claim 1, wherein each of said stiffening wings comprises a pair of parallel sheet-metal portions, which belong to different said L-shaped sheet-metal bodies and are mechanically connected to each other by means of several pairs of reciprocally directed nozzles, the nozzles of each pair being punched in different L-shaped bodies and welded to each other to constitute a hydraulic connection through the stiffening wing.

4. Fuel assembly according to claim 1, in which each of said wings has a horizontal bottom part, the radial inner edge of said bottom part defining partially a central water inlet opening for said stiffening device.

5. Fuel assembly according to claim 1, in which the water passageway of each of said wings communicates with the exterior of said fuel channel through a plurality of openings arranged one above another.

6. Fuel assembly according to claim 1, wherein each of said stiffening wings is traversed in a horizontal direction by several short, horizontal channels arranged one above another adjacent to said fuel channel side walls, each of said short channels being at least partially defined by said fuel channel side wall.

* * * * *